United States Patent [19]

Torkelson

[11] Patent Number: 5,493,850
[45] Date of Patent: Feb. 27, 1996

[54] LAKE BOTTOM PLANT AND DEBRIS GATHERING APPARATUS WITH IMPROVED ACTUATION AND CLEANING OF RAKING MECHANISM

[76] Inventor: James M. Torkelson, 23148 Nightengale St., St. Francis, Minn. 55070

[21] Appl. No.: 354,334

[22] Filed: Dec. 12, 1994

[51] Int. Cl.$^6$ .................. A01D 44/00; A01D 43/02; A01D 76/00
[52] U.S. Cl. .................. 56/8; 56/387; 56/400.04; 56/400.05; 56/400.08
[58] Field of Search .................. 56/8, 9, 393, 394, 56/400.01, 384, 400.04, 400.05, 400.08, 387

[56] References Cited

U.S. PATENT DOCUMENTS

| | | | |
|---|---|---|---|
| 29,795 | 8/1860 | Kinsey | 56/393 |
| 760,149 | 5/1904 | Ramer | 56/393 |
| 2,065,733 | 12/1936 | Pearson | 56/8 |
| 3,863,237 | 1/1975 | Doerr | 15/1.7 |
| 4,137,693 | 2/1979 | Thompson et al. | 56/8 |
| 4,696,149 | 9/1987 | Hawk | 56/8 |
| 4,768,331 | 9/1988 | Jones | 56/8 |
| 4,852,337 | 8/1989 | Peterson | 56/8 |
| 5,074,105 | 12/1991 | Roth | 56/8 |
| 5,146,997 | 9/1992 | Korin | 172/42 |
| 5,261,218 | 11/1993 | Jones et al. | 56/366 |
| 5,287,935 | 2/1994 | Foeller | 172/136 |

*Primary Examiner*—Stephen J. Novosad
*Attorney, Agent, or Firm*—Roger W. Jensen

[57] ABSTRACT

A plant gathering apparatus for the removal of aquatic plant growth on lake bottoms includes a mobile frame adapted for towing across a lake bottom, a raking mechanism, a towing assembly, an actuating mechanism and a cleaning mechanism. The raking mechanism mounts to the rear end of the frame to undergo pivotal movement between a raised inoperative position and a lowered position in which the raking mechanism is adapted to engage and gather aquatic plant growth as the mobile frame is towed across the lake bottom. The towing assembly mounts to the front end of the mobile frame for use in towing the mobile frame and is rotatable relative to the mobile. The actuating mechanism mounts to the mobile frame for moving the raking mechanism between the lowered and raised positions in response to rotation of the towing assembly. The cleaning mechanism mounts to the mobile frame and has portions extending along the raking mechanism for the removal of accumulated plant material from the raking mechanism as it is moved from the lowered to raised position. A plant conditioning roller can also be utilized to press down the aquatic plant growth prior to being engaged by the raking mechanism.

26 Claims, 5 Drawing Sheets

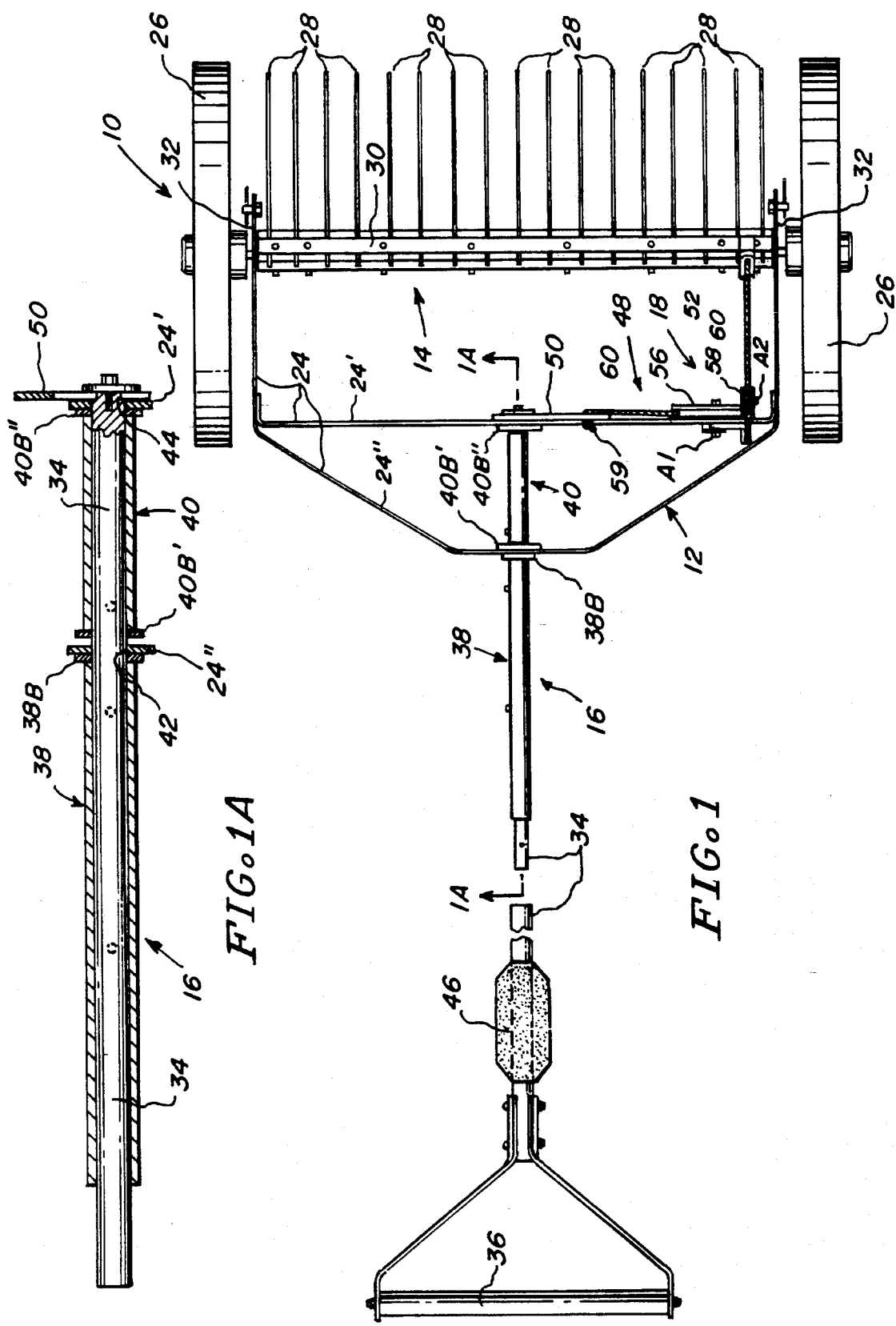

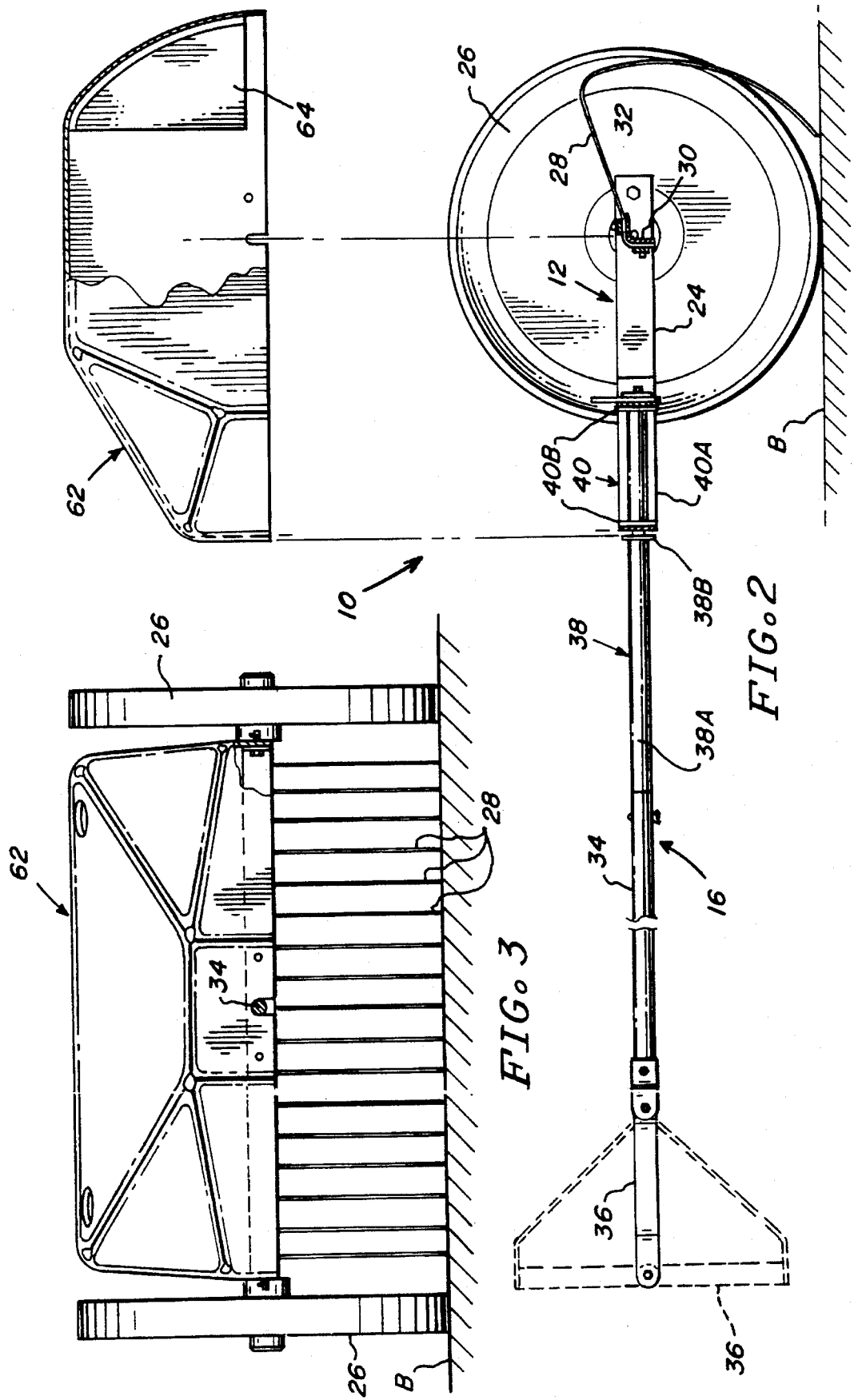

LAKE BOTTOM PLANT AND DEBRIS GATHERING APPARATUS WITH IMPROVED ACTUATION AND CLEANING OF RAKING MECHANISM

BACKGROUND OF THE INVENTION

1. Field of the Invention

The present invention generally relates to the removal of unwanted aquatic plant material and/or other debris from lake bottoms and, more particularly, is concerned with a lake bottom plant gathering apparatus with improved actuation and cleaning of its plant raking mechanism.

2. Description of Problems and the Prior Art

Aquatic plants tend to grow in lakes throughout the United States and other parts of the world. Nutrients in the water of many lakes settle at the bottoms and provide nourishment for plant growth. In shallow areas, plants can grow out of control and make the water unsuitable for swimming, fishing or boating and can choke off other aquatic life. Herbicides have been used to combat this problem of rapid aquatic plant growth, but certain of them have proven unsuitable because of harmful effects on fish and other sensitive aquatic life.

Another problem sometimes encountered with the bottoms of lakes and rivers is other debris such as branches of trees, and discarded bottles and cans; such debris is potentially dangerous to humans wading or walking along the bottom.

Various devices have been developed to address the need for removing plants both on ground and below water. One example is the two-wheeled hay rake used by farmers years ago. This device involved a two-wheeled rake with tines that hung down between the wheels and was pulled by a team of horses or a tractor. As hay would accumulate under the tines, a human operator riding along would operate a lever to raise the tines up to thereby drop the load of hay. The operator would then return the tines back to the lowered position to gather up more hay as the device moved along. Up until the present, however, this two-wheeled rake has not been adapted for use under water. Other representative examples of devices used on ground are disclosed in U.S. Pat. No. 5,261,218 to Jones et al. and U.S. Pat. No. 5,287,935 to Foeller.

Many devices have also been developed specifically to provide for the removal of aquatic plant growth. Tug or boat dredges have been used for the harvesting of sea weed and the like. Such dredges generally have a leading cutting edge that is adapted to sever the material to be harvested from the ocean or lake bottom and a receptacle to retain the harvested material. But these dredges are meant for use in large bodies of water and are therefore not suitable for use in lakes or ponds that are too small for large boats.

Other devices have been developed in response to the need for removing aquatic plant growth from small bodies of water or from shallow areas of large bodies of water. While the common rigid yard rake with short, rigid tines and a rigid transverse bar atop the tines has been used for this purpose, it is an inefficient and time consuming way to remove and collect aquatic plants. Devices have therefore been developed that utilize a cutting edge or rake in combination with a variety of other techniques to guide the devices over lake or pond bottoms for the removal and collection of aquatic plants. Representative examples of these devices are disclosed in U.S. Pat. No. 3,863,237 to Doerr, U.S. Pat. No. 4,137,693 to Thompson et al., U.S. Pat. No. 4,696,149 to Hawk, U.S. Pat. No. 4,768,331 to Jones, U.S. Pat. No. 4,852,337 to Peterson, U.S. Pat. No. 5,074,105 to Roth and U.S. Pat. No. 5,146,997 to Korin.

The Doerr patent discloses a device with a leading cutting edge and a receptacle for the cut plants. While this device may seem simple, it lacks efficiency as the receptacle must be raised from the water and emptied each time it fills with plant stalks. Also, cutting edges tend only to sever plant stalks rather than remove both the plants and their roots as rake teeth or tines are more likely to do.

The Thompson patent discloses a motor-powered device with a pair of drive wheels that moves a rake with teeth backward and forward for the removal of aquatic plants. The problem with this device is that it is only adapted to be mounted on a beach or shoreline of a lake.

The Hawk patent discloses a device with a floating hull and pivotally attached boom which drags a transverse bar with a plurality of tines through muck to loosen and remove the roots of aquatic plants. A mesh scoop then collects plants that rise to the surface of the water. This device, however, is elaborate and complex, and does not have a tine cleaning mechanism.

The Jones patent discloses a device having a frame with teeth that removes aquatic plants and drags them to a central collection site on shore. A rope or chain is used to pull the rake out and in from the water. While this device may seem simple, it lacks efficiency as the teeth may become cluttered with plant stalks and thus fail to operate properly until the teeth are cleaned of debris.

The Peterson patent discloses a device with improved raking teeth having a relatively flexible and resilient filament extending between and loosely through the tines to distribute stress among the teeth. The problem with this arrangement is that it is complex and does not have a tine cleaning mechanism.

The Roth patent discloses a device having a lake rake operated by an articulated-boom hoist attached to a motorized vehicle. A rake float is used to transport the rake a select distance from the vehicle where the rake is then dropped to the lake bottom and pulled back toward the vehicle. The hoist then lifts the rake and then tilts and shakes it appropriately to cause accumulated plants to drop from it so as to permit the process to repeat itself. Although this device functions to gather and dump accumulated plant material, the overall process is nevertheless complex and does not have a rake cleaning mechanism.

The Korin patent discloses a device with two units, one land-based and the other submersible. The land-based unit has an engine that runs a hydraulic pump that drives a hydraulic motor on the submersible unit by way of an elongated hose. The submersible unit also includes a rotatable drum with tines for grubbing aquatic plants. Like other mentioned devices, however, this device does not have a tine cleaning mechanism and is complex.

Consequently, a need still exists for a simple lake rake having a tine cleaning mechanism for the efficient removal of unwanted aquatic plants and their roots from small or shallow bodies of water.

SUMMARY OF THE INVENTION

The present invention provides a lake bottom plant and debris gathering apparatus with improved actuation and cleaning of its plant raking mechanism which is designed to satisfy the aforementioned need. A principal advantage of the apparatus is the cooperative functioning of actuating and cleaning mechanisms to operate a raking mechanism in a manner which prevents accumulated plant material and debris from cluttering the raking mechanism. The cleaning mechanism forces the release of unwanted plant material and debris from the raking mechanism. The gathered plant material can be dropped on the ground adjacent to the shoreline or in the water adjacent to the shoreline. Also, the invention can be used where it is not possible to walk away from the shoreline, such as where the shoreline has a steep bank or is heavily wooded; more specifically, the raking mechanism can be pulled by a boat away from the shoreline. For this case, the unwanted plant material and debris can be released back into the water. The plant material will then float up to the lake surface and drift to deeper water or to the shore where it then can be more easily removed. Thus, in such manner the plant gathering apparatus is rendered more effective and efficient in removing unwanted plant material and debris from lake bottoms.

Accordingly, the present invention is directed to a plant gathering apparatus for removal of aquatic plant growth and debris on a lake bottom. The plant and debris gathering apparatus comprises: (a) a mobile frame having front and rear ends and being adapted for towing across a lake bottom; (b) a raking mechanism mounted to the rear end of the mobile frame so as to undergo movement relative thereto between a raised inoperative position and a lowered position in which the raking mechanism is adapted to engage and gather aquatic plant growth and/or debris as the mobile frame is towed across the lake bottom; and (c) means mounted to the mobile frame and connected to the raking mechanism for actuating the raking mechanism between the lowered position and raised position.

More particularly, the plant and debris gathering apparatus includes a towing assembly mounted to and extending forwardly of the front end of the mobile frame for use in towing the mobile frame across the lake bottom. The towing assembly also is coupled to the mobile frame to undergo rotational movement relative thereto between first and second positions being angularly displaced from one another. The actuating means includes an actuating mechanism mounted to the mobile frame and connected to the towing assembly and being operable to cause movement of the raking mechanism between the lowered position and raised position in response to rotational movement of the towing assembly between the first position and second position.

Also, the plant gathering apparatus includes a cleaning mechanism mounted to the mobile frame and having portions extending along the raking mechanism for removal of accumulated plant material from the raking mechanism as the raking mechanism is moved from the lowered position to the raised position.

Further, the plant and debris gathering apparatus may include plant conditioner means mounted to the mobile frame and extending downwardly and forwardly therefrom for engaging and pressing downward aquatic plant growth on the lake bottom prior to engagement thereof by the raking mechanism.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top plan view of the plant gathering apparatus of the present invention.

FIG. 1A is an enlarged cross-sectional view of the towing assembly taken along 1A—1A of FIG. 1.

FIG. 2 is an exploded side elevational view of the plant gathering apparatus showing a detachable hood mounting one embodiment of a plant cleaning mechanism of the present invention.

FIG. 3 is a front elevational view of the plant gathering with the hood mounted thereon.

DETAILED DESCRIPTION OF THE INVENTION

Figure 4:
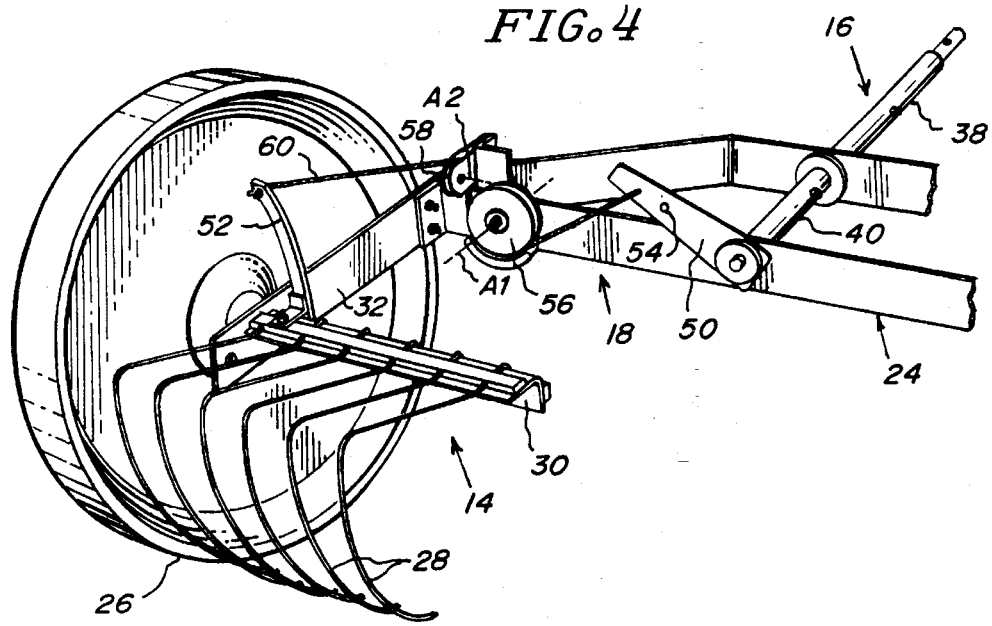
FIG. 4 is a fragmentary rear perspective view of the raking and actuating mechanisms of the plant gathering apparatus of the present invention.

Referring to the drawings and particularly to FIGS. 1 to 5, there is illustrated a plant and debris gathering apparatus, generally designated 10, of the present invention, being adapted for use on a bottom B of a lake for gathering and removing aquatic plant growth. The plant gathering apparatus 10 basically includes a mobile frame 12, a raking mechanism 14, a towing assembly 16 and an actuating mechanism 18. Also, preferably, the plant gathering apparatus 10 includes an accumulated plant cleaning mechanism 20 and, optionally, a plant conditioner mechanism 22 (see FIG. 8).

Referring to FIGS. 1, 2 and 4, the mobile frame 12 of the apparatus 10 is adapted for towing across the lake bottom B. The mobile frame 12 of apparatus 10 includes a rigid framework 24 and a pair of wheels 26 rotatably attached to opposing sides of the framework 24. Alternatively, the framework 24 may employ other means for rendering it movable and towable along the lake bottom B. One such means is a pair of skids (not shown) which can be substituted in place of the wheels 26 as a means for mobilizing the plant gathering apparatus 10 for movement across the lake bottom B.

Referring to FIGS. 1, 2 and 4–7, the raking mechanism 14 of the apparatus 10 is mounted to the rear end of the mobile frame 12 so as to undergo movement relative thereto between a raised inoperative position (as shown in phantom line form in FIGS. 5 and 7) and a lowered position (as shown in solid line form in FIGS. 2 and 4–7) in which the raking mechanism 14 is positioned and adapted to engage and gather aquatic plant growth as the mobile frame 12 is towed across the lake bottom B. The raking mechanism 14 includes a plurality of tines 28 and a transverse bar 30. The respective tines 28 have hook-shaped configurations which adapt them to engage and gather plant growth when in their lowered positions. The elongated transverse bar 30 mounts the plurality of tines 28 in laterally spaced side-by-side relationship with respect to one another on the bar 30. The transverse bar 30, in turn, is mounted at its opposite ends to and extends between a pair of rearwardly extending side extension members 32 of the rigid framework 24 of the mobile frame 12. The transverse bar 30 is so mounted to undergo rotational movement relative to the rigid framework 24 so as to thereby move the tines 28 between the lowered plant gathering position and raised inoperative position, as respectively seen in FIGS. 5 and 7.

Referring to FIGS. 1–4, the towing assembly 16 of the apparatus 10 is mounted to and extending forwardly from the front end of rigid framework 24 of the mobile frame 12. The towing assembly 16 is adapted for use by an operator in towing the mobile frame 12 across the lake bottom B. For instance, the operator may manually tow the frame by pulling on the handle while the operator walks on the bottom of the lake or river. Alternatively, an operator in a boat on the lake surface (not shown) above the apparatus 10 can hold onto the towing assembly 16 and pull or push the apparatus 10 across the lake bottom B.

More particularly, the towing assembly 16 includes an elongated solid shaft 34, a handle 36 attached to a front end of the shaft 34, and a pair of spacers 38, 40 mounted on the shaft 34. The spacer 38 is fixed to the shaft 34 by a suitable means such as a bolt (not shown). The spacer 40 surrounds the shaft 34 and is positioned between frame members 24' and 24" as shown in FIG. 1. The shaft 34 is mounted to and extending forwardly from the framework 24 of the mobile frame 12 at the front end thereof. The shaft 34 is coupled to the framework 24 to undergo rotational movement about the longitudinal axis of the shaft relative to the framework between first and second positions, as respectively shown in solid and dashed line form in FIG. 2, being angularly displaced from one another. The elongated shaft 34 extends through a pair of aligned openings 42, 44 (see FIG. 1A) formed in spaced portions 24" and 24' of the framework 24 and is coupled thereto by the spacers 38, 40 disposed about and attached on the shaft 34 respectively forwardly of the framework 24 and between the openings 42, 44 therein. A thrust washer 38B is positioned around shaft 34 at the juncture of spacer 38 and frame member 24". A pair of thrust washers 40B' and 40B" are positioned around shaft 34 at the ends of spacer 40 adjacent frame members 24" and 24' respectively. Thus, the operator can either pull or push the machine by using the handle 36. The aforementioned coupling arrangement of the shaft 34 to the framework 24 permits the operator to rotate the elongated shaft 34 of the towing assembly 16 between the first and second positions to actuate the raking mechanism 14 between its lowered and raised positions as well as to permit pushing and pulling on the mobile frame 12 via the elongated shaft 34 of the towing assembly 16.

Also, as shown particularly in FIG. 1, the towing assembly 16 has an optional flotation body 46 mounted thereon adjacent to a free end thereof, such being next to the handle 36, so as to maintain the free end of the towing assembly 16 extending above the mobile frame 12 and thereby closer to the surface of the lake than is the mobile frame. Particularly, in the event the operator should let go of the handle 34 and thereby drops the towing assembly 16, the free end of towing assembly 16 will still float up to near the lake surface as a result of the presence of the flotation body 46 to where the operator can again reach and pick up the handle 36 of the towing assembly 16.

Referring to FIGS. 2 and 4–7, the actuating mechanism 18 of the apparatus 10 is mounted to mobile frame 12 and interconnected to towing assembly 16 and raking mechanism 14. The actuating mechanism 18 is operable to cause movement of the raking mechanism 14 between the lowered and raised positions in response to rotational movement of the towing assembly 16 between the aforementioned first and second positions. More particularly, the actuating mechanism 18 includes a motion transmitting arrangement 48 interconnecting the rear end of the elongated shaft 34 of the towing assembly 16 to the transverse bar 30 of the raking mechanism 14 so as to cause movement of the raking mechanism 14 from the lowered to raised positions in response to rotational movement of the shaft 34 from the first to second positions. The motion transmitting arrangement 48 includes a pair of levers 50, 52. The first 50 of the levers is attached to the rear end of the shaft 34 for undergoing movement therewith, whereas the second 52 of the levers is attached to an end of the transverse bar 30 for undergoing movement therewith. The first lever 50 preferably also has a stop element 54 engageable with the framework 24 of the mobile frame 12 so as to prevent overrotation of the shaft 34. The motion transmitting arrangement 48 also includes a pair of elements 56, 58 rotatably mounted to the framework 24 of the mobile frame 12 between the first and second levers 50, 52, and an elongated flexible member 60, such as a rope, attached at opposite ends to the respective first and second levers 50, 52. The flexible rope 60 is engaged with the rotatable elements 56, 58 for undergoing translational movement relative to the mobile frame 12 to thereby transmit motion to the second lever 52 so as to cause movement of the second lever 52 and of the raking mechanism 14 therewith between the lowered and raised positions in response to rotational movement of the shaft 34 and first lever 50 therewith between the first and second positions. In a first embodiment shown in FIG. 4, the rotatable elements 56, 58 are a pair of pulleys 56, 58 being rotatably mounted to the framework 24 of the mobile frame 12 about a pair of respective axes A1, A2 extending in a transverse relationship to one another. In a second embodiment shown in FIG. 6, the rotatable elements 56', 58' are a pair of crank levers 56', 58' being pivotally mounted about the pair of transverse axes A1, A2.

Therefore, to pivot raking mechanism 14 of apparatus 10 from the lowered to raised position, an operator holding onto the handle 36 thus rotates shaft 34 counterclockwise (as viewed from an operator's perspective in FIG. 4) causing first lever 50 to pull the forward end of rope 60 to the left and thereby causing the second lever 52 attached to the rear end of rope 60 to pivot forwardly and rotate the transverse bar 30 and raise the plurality of tines 28. Under the influence of the weight of plurality of tines 28 and their off-centered relationship to elongated transverse bar 30, the raking mechanism 14 will counterrotate and return to the lowered position upon the operator allowing the shaft 34 to counterrotate back to the first position.

Figure 5:
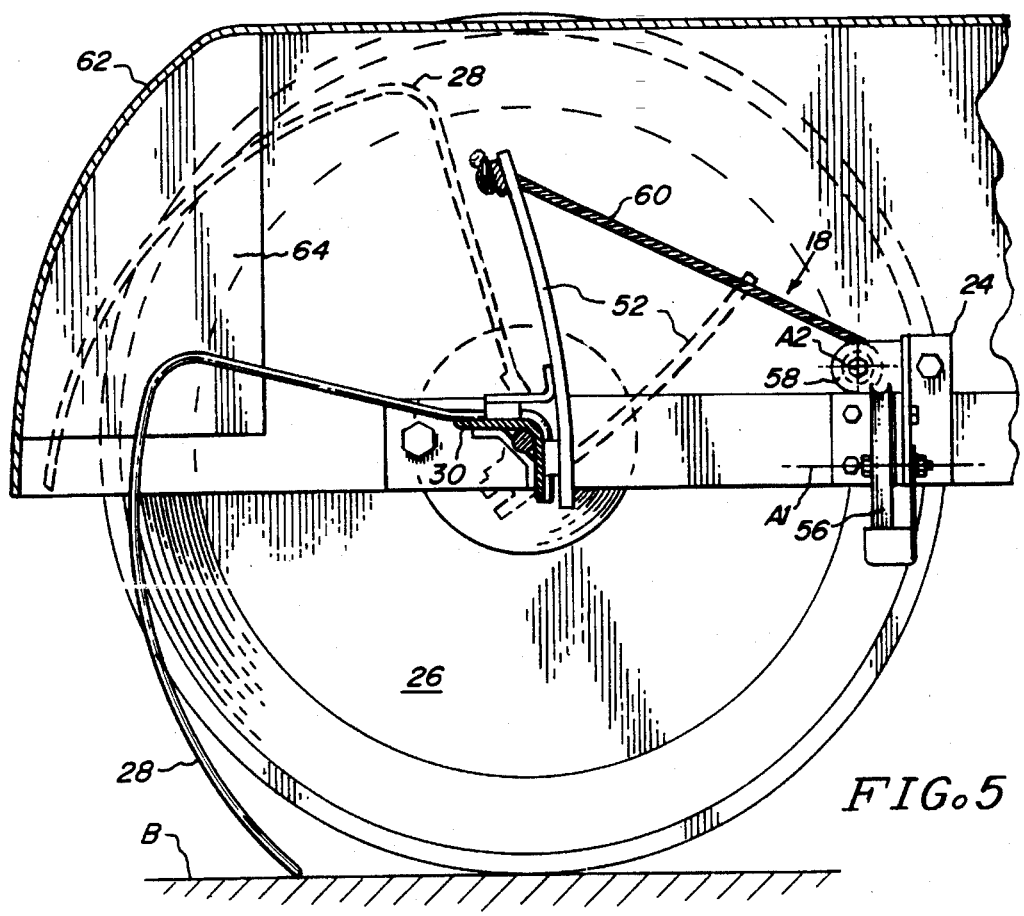
FIG. 5 is an enlarged side elevational view of the raking, actuating and cleaning mechanisms of the plant gathering apparatus.
Figure 6:
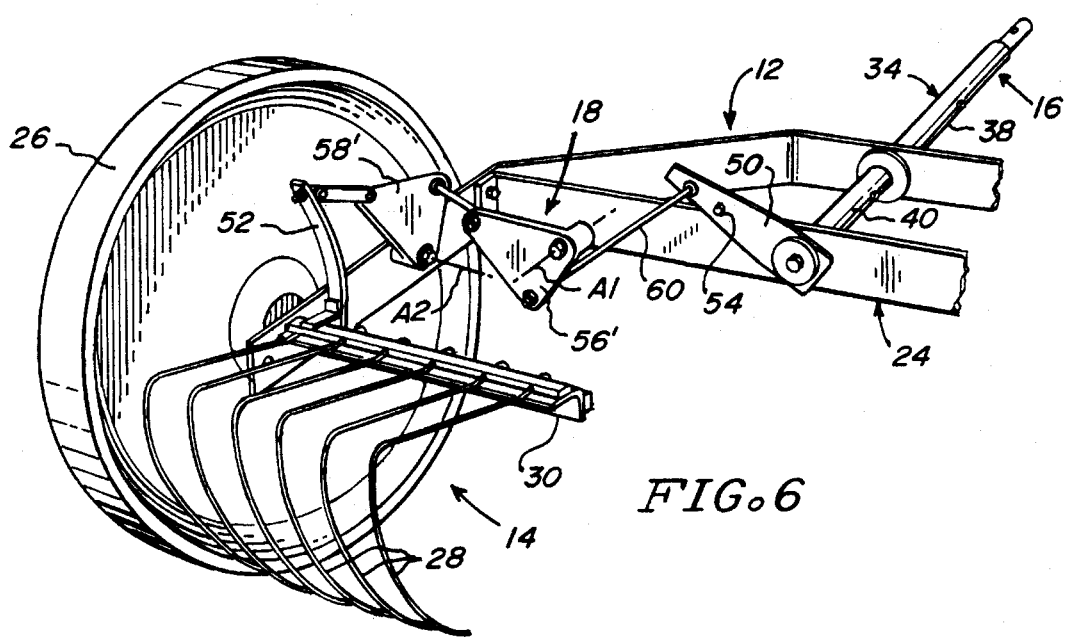
FIG. 6 is a view similar to that of FIG. 4 but showing another embodiment of the actuating mechanism of the plant gathering apparatus.

Referring to FIGS. 2, 3 and 5, the cleaning mechanism 20 of the apparatus 10 is mounted to the mobile frame 12 so as to have portions extending along the raking mechanism 14 and between the tines 28 thereof for removal of accumulated plant material therefrom as the raking mechanism is moved from the lowered position to the raised position. The cleaning mechanism 20 thus prevents accumulated plant material from cluttering the plurality of tines 28 of raking mechanism 14 and thus makes the raking mechanism 14 more effective in further removing unwanted plant material from the lake bottom B. In a first embodiment, the cleaning mechanism includes a hood 62 mounted on the framework 24 of the mobile frame 12 so as to substantially overlie and cover the raking mechanism 14, and a plurality of baffles 64 mounted to an underside of the hood 62 and extending downwardly therefrom in laterally spaced side-by-side relationship to one another and between the tines 28 for engaging and removing accumulated plant material therefrom when the raking mechanism 14 is moved from the lowered to raised position, as seen in FIG. 5. The hood 62 provides an additional function of operational safety (i.e., to shield errant human body parts such as hands and feet from the operational mechanism).

Figure 7:
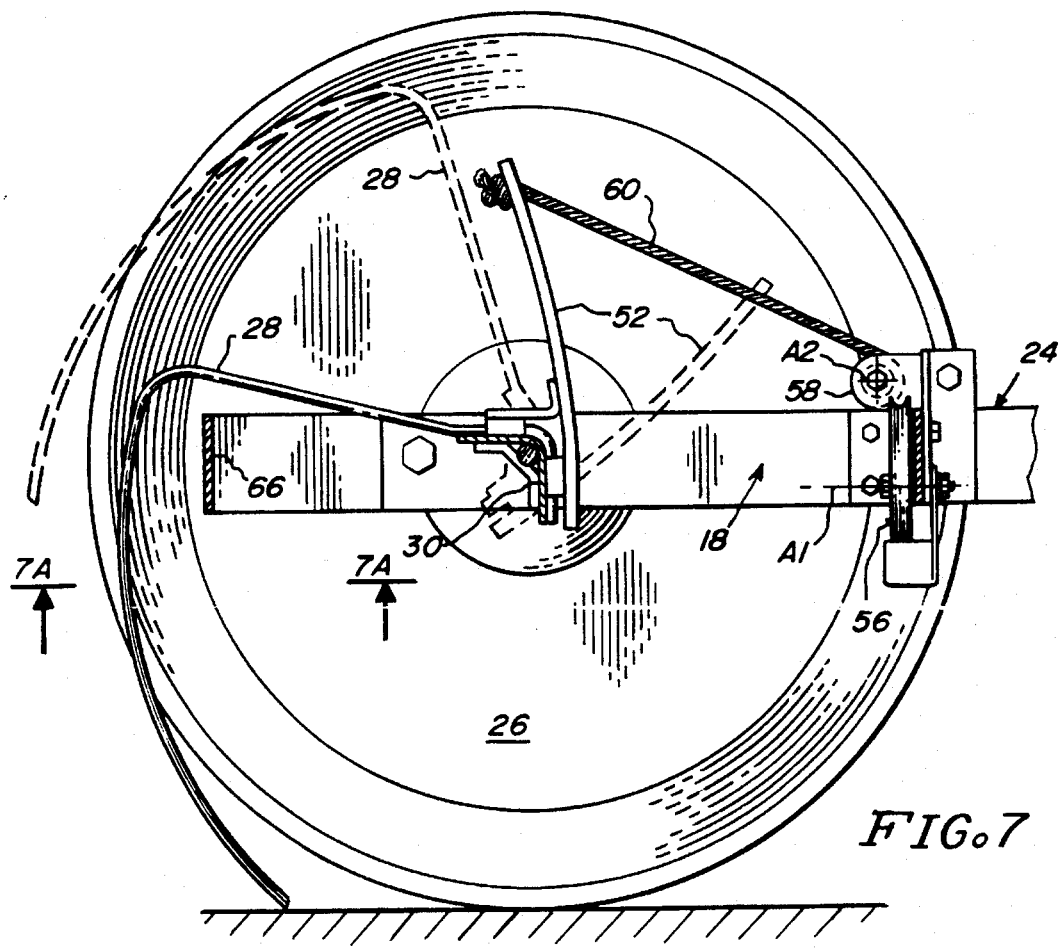
FIG. 7 is a view similar to that of FIG. 5, but showing another embodiment of the cleaning mechanism of the plant gathering apparatus.
Figure 7A:
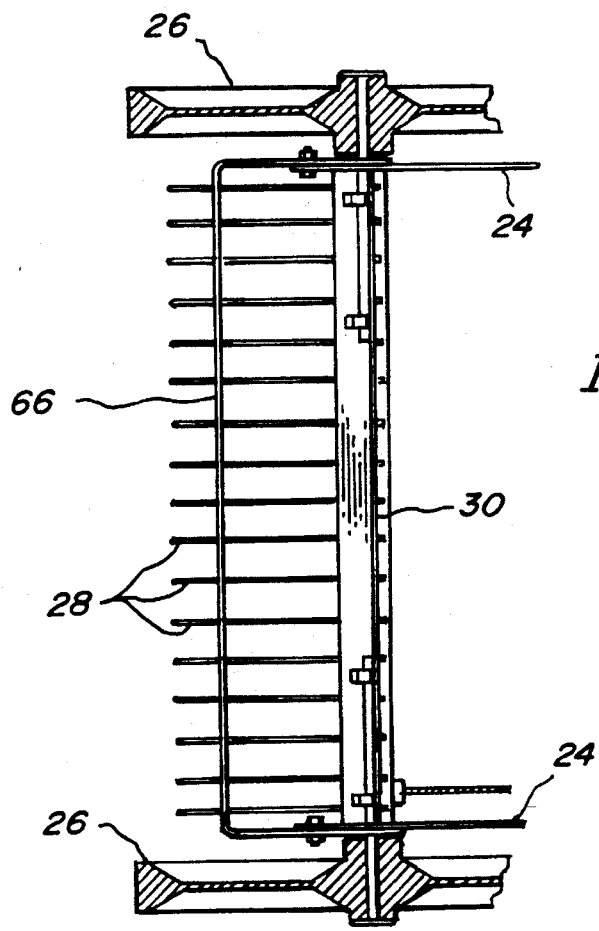
FIG. 7A is a bottom plan view of the cleaning mechanism as seen along line 7A—7A of FIG. 7.

Referring to FIGS. 7 and 7A, alternatively the cleaning mechanism 20 includes a plurality of members 66 mounted to the framework 24 of the mobile frame 12 and extending rearwardly therefrom in laterally spaced side-by-side relationship to one another and between the tines 28 also. Regardless of which embodiment is employed, the cleaning mechanism 20 forces the release of the plant material from raking mechanism 14 onto the land or into the water as aforesaid.

Figure 8:
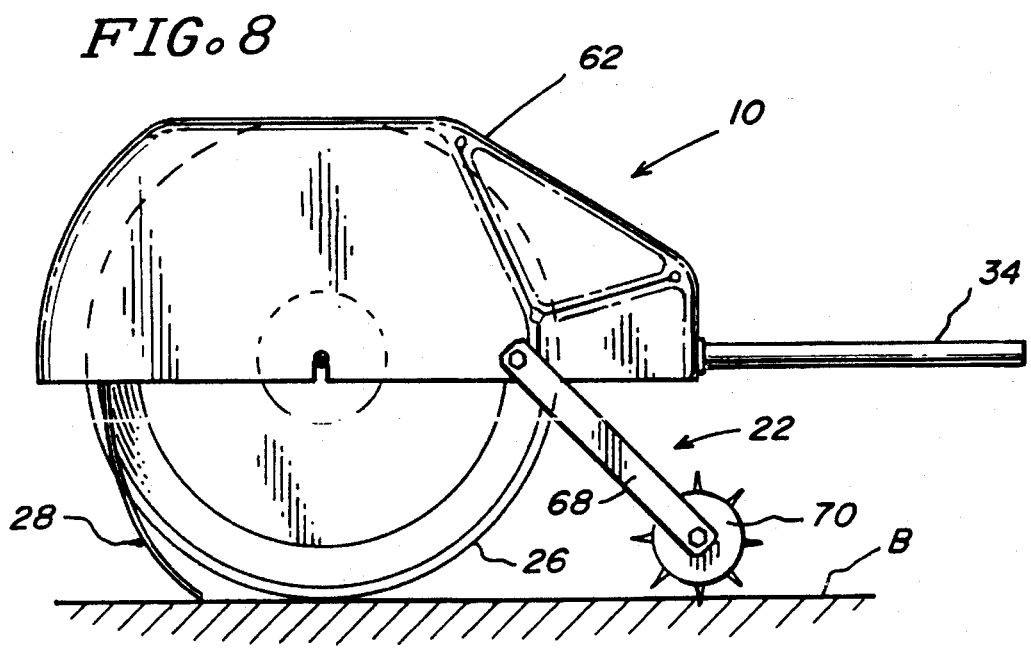
FIG. 8 is a side elevational view of the plant gathering apparatus incorporating an optional plant conditioning mechanism of the present invention.

Further, referring to FIG. 8, the optional plant conditioner mechanism of the apparatus 10 is mounted to the mobile frame 12 and extending downwardly and forwardly therefrom for engaging and pressing downward aquatic plant growth on the lake bottom B prior to engagement thereof by the tines 28 of the raking mechanism 14. The plant conditioner mechanism 22 includes a pair of arms 68 and a transverse roller 70. The arms 68 are mounted at upper ends to respective opposite sides of the rigid framework 24 of the mobile frame 12 and extend downwardly and forwardly therefrom. The transverse roller 70 is rotatably mounted between lower ends of the arms 68. Suitable biasing springs (not shown) can be provided between the rigid framework 24 and the arms 68 so as to assist gravity in exerting a downward force on the roller 70 to engage and press down the aquatic plant growth as the mobile frame 12 is towed across the lake bottom B. Thus, the function of the roller 70 is to mash down somewhat the plant growth so that the fines 28 will be able to more efficiently catch the plant growth.

Other optional plant conditioner means (not shown) could be used. For example, a cutting bar or wire could be connected to arms 68 shown in FIG. 8.

The towing assembly 16 may be of various longitudinal lengths. A distance of approximately 9 feet from handle 36 to the rotational axis of wheels 26 has been found satisfactory. However, for some applications, it may be advantageous to extend the handle 36 further away from the wheels. This can be arranged by either using one or more extension shafts (not shown) coupled to shaft 34 or by substituting for shaft 34 a longer shaft.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A plant gathering apparatus for removal of aquatic plant growth on a lake bottom, comprising:

(a) a mobile frame having front and rear ends and being adapted for towing across a lake bottom;

(b) a raking mechanism mounted to said rear end of said mobile frame so as to undergo movement relative thereto between a raised inoperative position and a lowered position in which said raking mechanism is adapted to engage and gather aquatic plant growth as said mobile frame is towed across the lake bottom; and (c) towing and actuating means mounted to said mobile frame and connected to said raking mechanism for both towing said mobile frame and for actuating said raking mechanism between said lowered position and raised position, said towing and actuating means including (i) an elongated shaft mounted to and extending forwardly from said front end of said mobile frame for undergoing rotational movement relative thereto between first and second positions being angularly displaced from one another, and (ii) a motion transmitting arrangement interconnecting said shaft to said raking mechanism so as to cause movement of said raking mechanism from said lowered position to said raised position in response to said rotational movement of said shaft from said first position to said second position.

2. The apparatus of claim 1 wherein said mobile frame includes a framework and a pair of wheels attached to opposing sides of said framework.

3. The apparatus of claim 1 wherein said raking mechanism includes:

a plurality of tines; and an elongated transverse bar mounting said plurality of tines in laterally spaced side-by-side relationship with respect to one another on said bar, said transverse bar being mounted to said mobile frame for undergoing rotational movement relative thereto so as to thereby move said tines between said lowered plant gathering position and said raised inoperative position.

4. The apparatus of claim 1 wherein said motion transmitting arrangement of said actuating mechanism includes a pair of levers, a first of said levers being attached to a rear end of said shaft of said actuating means for undergoing movement therewith, a second of said levers being attached to said transverse bar of said raking mechanism for undergoing movement therewith.

5. The apparatus of claim 4 wherein said motion transmitting arrangement of said actuating mechanism also includes:

a pair of elements rotatably mounted to said mobile frame between said levers; and an elongated flexible member attached at opposite ends to said respective first and second levers and engaged with said rotatable elements for undergoing translational movement relative to said mobile frame to thereby transmit motion to said second lever so as to cause movement of said second lever and of said raking mechanism therewith between said lowered position and said raised position in response to rotational movement of said shaft between said first position and said second position and of said first lever therewith.

6. The apparatus of claim 5 wherein said elements are mounted to said mobile frame for rotation about a pair of respective axes extending in a transverse relationship to one another.

7. The apparatus of claim 4 wherein said first lever includes a stop element engageable with said mobile frame so as to prevent overrotation of said shaft relative thereto.

8. A plant gathering apparatus for removal of aquatic plant growth on a lake bottom, comprising:

(a) a mobile frame having front and rear ends and adapted for towing across a lake bottom;

(b) a raking mechanism mounted to said rear end of said mobile flame so as to undergo movement relative thereto between a raised inoperative position and a lowered position in which said raking mechanism is adapted to engage and gather aquatic plant growth as said mobile frame is towed across the lake bottom;

(c) a towing assembly mounted to and extending forwardly of said front end of said mobile frame for use in towing said mobile frame across a lake bottom, said towing assembly also being coupled to said mobile frame to undergo rotational movement relative thereto between first and second positions being angularly displaced from one another; and (d) an actuating mechanism mounted to said mobile frame and connected to said towing assembly and being operable to cause movement of said raking mechanism between said lowered position and said raised position in response to rotational movement of said towing assembly between said first position and said second position.

9. The apparatus of claim 8 wherein said mobile frame includes a framework and a pair of wheels attached to opposing sides of said framework.

10. The apparatus of claim 8 further comprising:

a flotation body mounted on said towing assembly adjacent to a free end thereof so as to maintain said free end of said towing assembly extending above said mobile frame and thereby closer to a surface of the lake than said mobile frame.

11. The apparatus of claim 8 wherein said actuating mechanism includes a motion transmitting arrangement interconnecting said towing assembly to said raking mechanism so as to cause movement of said raking mechanism from said lowered position to said raised position in response to rotational movement of said towing assembly from said first position to said second position.

12. The apparatus of claim 11 wherein said motion transmitting arrangement of said actuating mechanism includes a pair of levers, a first of said levers being attached to a rear end of said towing assembly for undergoing movement therewith, a second of said levers being attached to said raking mechanism for undergoing movement therewith.

13. The apparatus of claim 12 wherein said motion transmitting arrangement of said actuating mechanism also includes:

a pair of pulleys rotatably mounted to said mobile frame between said levers; and an elongated flexible member attached at opposite ends to said respective first and second levers and entrained under and over said pulleys for undergoing translational movement relative to said mobile frame to thereby transmit motion to said second lever so as to cause movement of said second lever and of said raking mechanism therewith between said lowered position and said raised position in response to rotational movement of said towing assembly between said first position and said second position and of said first lever therewith.

14. The apparatus of claim 13 wherein said pulleys are mounted to said mobile frame for rotation about a pair of respective axes extending in a transverse relationship to one another.

15. The apparatus of claim 12 wherein said first lever includes a stop element engageable with said mobile frame so as to prevent the overrotation of said towing assembly relative thereto.

16. The apparatus of claim 8 wherein said towing assembly includes an elongated shaft mounted to and extending forwardly from said front end of said mobile frame for undergoing said rotational movement between said first and second positions.

17. The apparatus of claim 16 wherein said towing assembly also includes thrust bearing means disposed about and attached to said shaft and coupled to said mobile frame so as to permit pushing and pulling on said mobile frame via said shaft as well as rotational movement of said shaft relative to said mobile frame.

18. The apparatus of claim 16 wherein said actuating mechanism includes a motion transmitting arrangement interconnecting said shaft to said raking mechanism so as to cause movement of said raking mechanism from said lowered position to said raised position in response to rotational movement of said shaft from said first position to said second position.

19. The apparatus of claim 18 wherein said raking mechanism includes:

a plurality of tines; and an elongated transverse bar mounting said plurality of tines in laterally spaced side-by-side relationship with respect to one another on said bar, said transverse bar being mounted to said mobile frame for undergoing rotational movement relative thereto so as to thereby move said tines between said lowered and raised positions.

20. The apparatus of claim 19 wherein said motion transmitting arrangement of said actuating mechanism includes a pair of levers, a first of said levers being attached to a rear end of said shaft for undergoing rotational movement therewith, a second of said levers being attached to said transverse bar of said raking mechanism for undergoing movement therewith.

21. The apparatus of claim 20 wherein said motion transmitting arrangement of said actuating mechanism also includes:

a pair of pulleys rotatably mounted to said mobile frame between said levers; and an elongated flexible member attached at opposite ends to said respective first and second levers and entrained under and over said pulleys for undergoing translational movement relative to said mobile frame to thereby transmit motion to said second lever to cause movement of said second lever and of said raking mechanism therewith between said lowered position and said raised position in response to rotational movement of said rotatable shaft between said first position and said second position and of said first lever therewith.

22. The apparatus of claim 8 wherein said raking mechanism includes:

a plurality of tines; and an elongated transverse bar mounting said plurality of tines in laterally spaced side-by-side relationship with respect to one another on said bar, said transverse bar being mounted to said mobile frame for undergoing rotational movement relative thereto so as to thereby move said tines between said lowered and raised positions.

23. A plant gathering apparatus for removal of aquatic plant growth on a lake bottom, comprising:

(a) a mobile frame having front and rear ends and being adopted for towing across a lake bottom;

(b) a raking mechanism mounted to said rear end of said mobile frame so as to undergo movement relative thereto between a raised inoperative position and a lowered position in which said raking mechanism is adapted to engage and gather aquatic plant growth as said mobile frame is towed across the lake bottom;

(c) means mounted to said mobile frame and connected to said raking mechanism for actuating said raking mechanism between said lowered position and raised position; and (d) a cleaning mechanism mounted to said mobile frame and having positions extending along said raking mechanism for removal of accumulated plant material from said raking mechanism as said raking mechanism is moved from said lowered position to said raised position, said cleaning mechanism including a hood mounted on said mobile frame so as to substantially overlie said raking mechanism; and a plurality of baffles mounted to an underside of said hood and being extending downwardly therefrom in laterally spaced side-by-side relationship to one another.

24. A plant gathering apparatus for removal of aquatic plant growth on a lake bottom, comprising:

(a) a mobile frame having front and rear ends and being adopted for towing across a lake bottom;

(b) a raking mechanism mounted to said rear end of said mobile frame so as to undergo movement relative thereto between a raised inoperative position and a lowered position in which said raking mechanism is adapted to engage and gather aquatic plant growth as said mobile frame is towed across the lake bottom wherein said raking mechanism includes a plurality of tines, and an elongated transverse bar mounting said plurality of tines in laterally spaced side-by-side relationship with respect to one another on said bar, said transverse bar being mounted to said mobile frame for undergoing rotational movement relative thereto so as to thereby move said tines between said lowered plant gathering position and said raised inoperative position;

(c) means mounted to said mobile frame and connected to said raking mechanism for actuating said raking mechanism between said lowered position and raised position; and (d) a cleaning mechanism mounted to said mobile frame and having portions extending along said raking mechanism for removal of accumulated plant material from said raking mechanism as said raking mechanism is moved from said lowered position to said raised position wherein said cleaning mechanism includes:

a hood mounted on said mobile frame so as to substantially overlie said raking mechanism; and a plurality of baffles mounted to an underside of said hood and being extending downwardly therefrom in laterally spaced side-by-side relationship to one another and between said tines of said plurality thereof for removing accumulated plant material therefrom when said raking mechanism is moved from said lowered position to said raised position.

25. A plant gathering apparatus for removal of aquatic plant growth on a lake bottom, comprising:

(a) a mobile frame having front and rear ends and being adapted for towing across a lake bottom;

(b) a raking mechanism mounted to said rear end of said mobile frame so as to undergo movement relative thereto between a raised inoperative position and a lowered position in which said raking mechanism is adapted to engage and gather aquatic plant growth as said mobile frame is towed across the lake bottom;

(c) means mounted to said mobile frame and connected to said raking mechanism for actuating said raking mechanism between said lowered position and raised position; and (d) plant conditioner means mounted to said mobile frame and extending downwardly and forwardly therefrom for engaging and pressing downward aquatic plant growth on the lake bottom prior to engagement thereof by said raking mechanism.

26. The apparatus of claim 25 wherein said conditioner means includes:

a pair of arms mounted at upper ends to respective opposite sides of said mobile frame and extending downwardly and forwardly therefrom; and a transverse roller rotatably mounted between lower ends of said arms and being adapted to engage and press down the aquatic plant growth as said mobile frame is towed across the lake bottom.

* * * * *